Sept. 3, 1946.  J. E. BUXTON  2,407,132
ENGINE STARTER GEARING
Filed Dec. 29, 1944
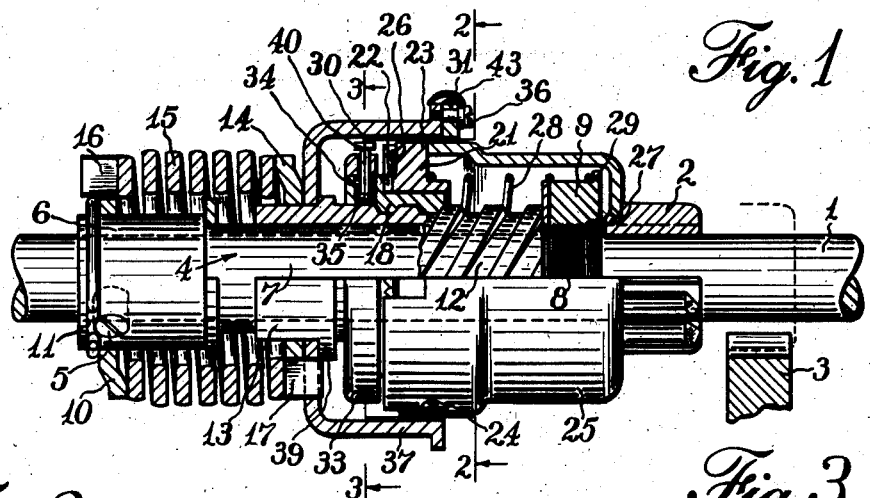
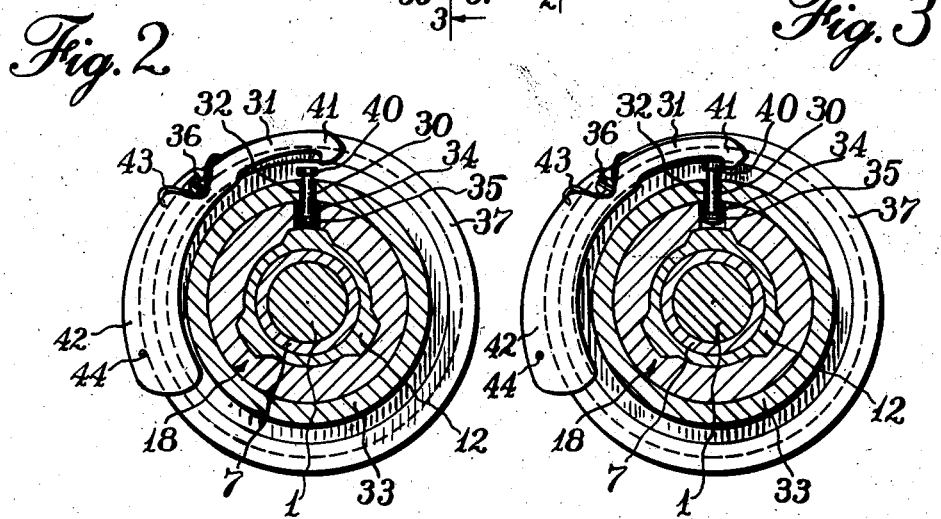
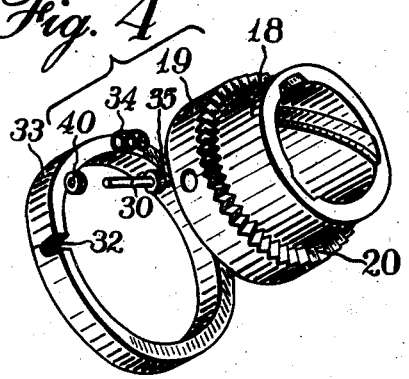
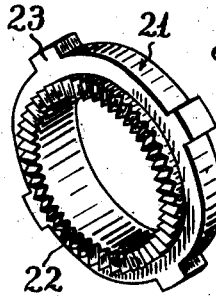
WITNESS
Esther M. Stockton
INVENTOR.
James E. Buxton
BY Clinton S. James
ATTORNEY Patented Sept. 3, 1946

2,407,132

UNITED STATES PATENT OFFICE 2,407,132

ENGINE STARTER GEARING

James E. Buxton, Elmira, N. Y., assignor to Bendix Aviation Corporation, South Bend, Ind., a corporation of Delaware Application December 29, 1944, Serial No. 570,376

5 Claims. (Cl. 74—7)

The present invention relates to engine starter gearing and more particularly to an automatically disconnectable starter drive of the type which is arranged to maintain its engagement with the engine until it is reliably self-operative.

It is an object of the present invention to provide a novel starter drive which is positively held in engagement until the engine is successfully started.

It is a further object to provide such a device in which the release of the holding means takes place quickly and reliably.

It is another object to provide such a device in which a part of the holding means serves also as an anti-drift detent to prevent undesired engagement of the gearing.

Further objects and advantages will be apparent from the following description taken in connection with the accompanying drawing in which:

Fig. 1 is a side elevation partly in section of a preferred embodiment of the invention;

Fig. 2 is a section taken substantially on the line 2—2 of Fig. 1 showing the latching members in released position.

Fig. 3 is a similar view showing the latching parts in engaged position;

Fig. 4 is a detail in perspective of the internally threaded driving clutch member and Fig. 5 is a detail in perspective of the driven clutch member.

In Fig. 1 of the drawing there is illustrated a power shaft 1, and a pinion 2 slidably journalled on the power shaft for movement into and out of engagement with gear 3 of an engine to be started. A sleeve 4 is fixed on the power shaft in any suitable manner as indicated at 5 and is provided with a portion 6 of non-circular cross-section at one end, a cylindrical reduced portion 7 adjacent thereto, and a threaded terminal portion 8 on which is fixedly mounted a stop nut 9.

A driving plate member 10 is splined on the non-circular portion 6 of the sleeve 4 and is retained thereon by a thrust ring 11. A screw shaft 12 is slidably journalled on the cylindrical portion 7 of the sleeve 4 and is provided with a non-circular portion 13 on which is splined a driven anchor plate 14. A spring 15 connects the two anchor plates 10 and 14 by means of outturned ends 16 and 17 which enter slots in said anchor plates whereby the screw shaft is yieldably connected for both rotary and longitudinal movement with sleeve 4.

A driving clutch member in the form of a nut 18 is threaded on the screw shaft 12 and has a radial flange 19 (Fig. 4) on which are formed dentals 20. Means for connecting the pinion 2 to the driving clutch member 18 is provided comprising a driven clutch member 21 (Fig. 5) having dentals 22 adapted to cooperate with the dentals of the driving clutch member and having radial lugs 23 extending into corresponding openings 24 in a barrel member 25, and retained therein by a lock ring 26. The barrel member 25 is rigidly connected to the pinion as indicated at 27 whereby the pinion and driven clutch member 21 are constrained to move together as a unit. A light compression spring 28 is located between the driven clutch member 21 and a flange 29 on the stop nut 9 whereby the spring tends to hold the driven clutch member in engagement with the driving clutch member and also tends to demesh the pinion 2 from the engine gear 3.

Means are provided for holding the pinion in engagement with the engine gear in the form of a pair of cooperating latch members 30, and 31 (Fig. 2) mounted respectively on the driving clutch member 18 and a screw shaft 12. Latch member 30 is slidably mounted in a radial opening 32 in a ring 33 which is fixedly mounted in any suitable way as by brazing or welding on the driving clutch member 19. A spring 34 is arranged to yieldingly press the inner end 35 of the latch member 30 against the screw shaft and thereby cause it to act as an anti-drift member to prevent the pinion from undesired engagement with the engine gear.

The latch member 31 is pivoted at 36 to a cup member 37 which is non-rotatably mounted on the non-circular portion 13 of the screw shaft between the anchor plate 14 and a stop flange 39. The sliding latch member 30 has an enlarged head 40, and the pivoted latch member 31 has a hook 41 on one end which is formed to engage the head 40 of the latch member 30 as shown in Fig. 3 to prevent relative rotation between the nut member 18 and the screw shaft 12. The pivoted latch member 31 is provided with a weighted arm 42 which flies out under the influence of centrifugal force so as to bring the hook 41 into the path of the head 40 of latch member 30 when the latter has been moved out by centrifugal force against the action of the spring 34. A spring 43 normally retains the pivoted latch member 31 in retracted position as shown in Fig. 2, the inward movement of the weighted arm 42 being limited by a pin 44 which bears on the periphery of the ring 33.

In operation, starting with the parts in the positions illustrated in Fig. 1, rotation of the power shaft 1 is transmitted through the sleeve 4, anchor plate 10, spring 15 and anchor plate 14 to the screw shaft 12.

The driving clutch member 18 is thereby traversed away from idle position which motion is transmitted through the driven clutch member 21 and barrel 25 to the pinion 2 which is thereby moved into mesh with the engine gear 3. When the travel of the clutch members is arrested by the stop nut 9 the resistance to rotation of the pinion causes the spring 15 to be compressed and torqued until sufficient force is built up to rotate the engine gear 3.

During the cranking of the engine centrifugal force acts on the sliding latch member 30 to move it outward, and on the pivoted latch 31 to move the hook 41 inward until they are in position to engage as shown in Fig. 3. When the engine fires, the excess rotation of the pinion from the engine gear is transmitted through the barrel 25 to the clutch members whereby the driving clutch member 18 is caused to back away from the stop nut 9. As soon as this backward movement has progressed sufficiently to release the clutch members from each other, the head 40 of latch member 30 engages with the hook 41 on latch member 31 as shown in Fig. 3 and prevents further relative rotation between the driving clutch member and screw shaft. The pinion is thereby held in engagement with the engine gear while being permitted to overrun freely by the release of the engagement between the clutch members 18, 21.

If the engine should not continue self-operative, the driving clutch member again advances into engagement with the stop nut 9 and cranking is resumed. When a successful start has been secured, deenergization of the starting motor by the operator causes the speed of the screw shaft and clutch member 18 to be reduced sufficiently to permit the centrifugal latches to disengage. Inasmuch as this disengagement may be brought about by the retraction of either or both of the latch members, it is obvious that the release will take place quickly and infallibly when the power shaft slows down below the critical speed. This quick release of the latch is desirable in that it is conducive to a rapid and quiet demeshing movement of the pinion.

Although but one embodiment of the invention has been shown and described in detail, it will be understood that other embodiments are possible and various changes may be made in the form and arrangements of the parts without departing from the spirit of the invention as defined in the claims appended hereto.

What is claimed is:

1. In an engine starter drive, a power shaft, a pinion slidably journalled thereon for movement into and out of mesh with a gear of an engine to be started, a screw shaft mounted on the power shaft, means connecting the screw shaft to rotate with the power shaft, a nut on the screw shaft, means including a disconnectable clutch for actuating the pinion by the nut, a centrifugal latch member on the nut, a second centrifugal member and means for mounting the second centrifugal member for rotation with the screw shaft in position to cooperate with the latch member and prevent the nut from movement on the screw shaft to demesh the pinion.

2. In an engine starter drive, a power shaft, a pinion slidably journalled thereon for movement into and out of mesh with a gear of an engine to be started, a screw shaft mounted on the power shaft, means connecting the screw shaft to rotate with the power shaft, a nut on the screw shaft, means including a disconnectable clutch for actuating the pinion by the nut, a radially slidable centrifugal latch member on the nut, a second centrifugal member and means for pivotally mounting the second centrifugal member for rotation with the screw shaft, said second centrifugal member having a portion movable by centrifugal force into the path of said slidable latch member so as to prevent the nut from movement on the screw shaft to demesh the pinion.

3. An engine starter drive as set forth in claim 2 including further spring means normally pressing the sliding latch member into frictional engagement with the screw shaft.

4. In an engine starter drive a power shaft, a pinion slidably journalled thereon for movement into and out of mesh with a gear of an engine to be started, a screw shaft on the power shaft, a clutch member in the form of a nut threaded on the screw shaft, a second clutch member slidably journalled on the nut and rigidly connected to the pinion, yielding means urging the clutch members into engagement and tending to move them in unison in a direction to demesh the pinion, and centrifugal latch means preventing demeshing movement of the pinion while the nut is rotated above a predetermined speed.

5. An engine starter drive as set forth in claim 4 in which said centrifugal latch means includes two elements movable in opposite directions by centrifugal force so as to engage and prevent relative movement of the nut and screw shaft in a direction to demesh the pinion while they are rotating above a predetermined speed.

JAMES E. BUXTON.